United States Patent
Toonk et al.

(10) Patent No.: US 11,196,726 B2
(45) Date of Patent: Dec. 7, 2021

(54) SCALABLE IPSEC SERVICES

(71) Applicant: Cisco Technology, Inc., San Jose, CA (US)

(72) Inventors: Andree Toonk, Vancouver (CA); Grzegorz Boguslaw Duraj, Vancouver (CA); Alvin Sai Weng Wong, Delta (CA); Kyle Mestery, Woodbury, MN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 93 days.

(21) Appl. No.: 16/401,304

(22) Filed: May 2, 2019

(65) Prior Publication Data

US 2020/0280548 A1 Sep. 3, 2020

Related U.S. Application Data

(60) Provisional application No. 62/812,545, filed on Mar. 1, 2019.

(51) Int. Cl.
*H04L 29/06* (2006.01)
*H04L 9/18* (2006.01)
(Continued)

(52) U.S. Cl.
CPC .......... *H04L 63/0485* (2013.01); *H04L 45/16* (2013.01); *H04L 45/24* (2013.01); *H04L 63/061* (2013.01); *H04L 63/20* (2013.01)

(58) Field of Classification Search
None
See application file for complete search history.

(56) References Cited

U.S. PATENT DOCUMENTS

| 7,162,630 B2* | 1/2007 | Sperry | H04L 29/06 |
| | | | 713/153 |
| 7,234,063 B1* | 6/2007 | Baugher | H04L 9/0833 |
| | | | 380/259 |

(Continued)

FOREIGN PATENT DOCUMENTS

| WO | WO-2009018510 A1 * | 2/2009 | ........... H04L 63/061 |
| WO | 2018222323 A1 | 6/2018 | |

OTHER PUBLICATIONS

An IPsec Seamless Switching Mechanism with High Availability and Scalability by Extending IKEv2 Protocol. Yul. AlAl. (Year: 2011).*

(Continued)

*Primary Examiner* — Venkat Perungavoor
(74) *Attorney, Agent, or Firm* — Edell, Shapiro & Finnan, LLC (57) ABSTRACT

An Internet Key Exchange protocol message indicating a first Internet Protocol Security traffic flow is to be established via a first device is obtained at the first device. The Internet Key Exchange protocol message is forwarded from the first device to a second device. An encryption key used to transmit traffic via the first Internet Protocol Security Traffic flow is received at the first device from a key value store. The key value store is populated with the encryption key in response to the second device obtaining the Internet Key Exchange protocol message. A first data packet to be transmitted via the first Internet Protocol Security traffic flow is obtained at the first device. The first device provides the first data packet encrypted with the encryption key of the first Internet Protocol Security traffic flow.

20 Claims, 8 Drawing Sheets

(51) Int. Cl.
*H04L 12/761* (2013.01)
*H04L 12/707* (2013.01)
*H04L 9/12* (2006.01)

(56) References Cited

U.S. PATENT DOCUMENTS

| | | | | |
|---|---|---|---|---|
| 8,223,770 | B2 | 7/2012 | Wray et al. | |
| 9,712,440 | B2 | 7/2017 | Koodli et al. | |
| 9,742,626 | B2 | 8/2017 | Ramachandran et al. | |
| 10,609,008 | B2* | 3/2020 | Vemulapalli | H04L 9/002 |
| 2007/0248091 | A1* | 10/2007 | Khalid | H04L 63/0272 |
| | | | | 370/392 |
| 2008/0259936 | A1* | 10/2008 | Hussain | H04L 45/00 |
| | | | | 370/397 |
| 2009/0169005 | A1* | 7/2009 | Meyer | H04L 63/0428 |
| | | | | 380/255 |
| 2010/0223463 | A1* | 9/2010 | Sakaguchi | H04L 9/083 |
| | | | | 713/168 |
| 2011/0004913 | A1 | 1/2011 | Nagarajan et al. | |
| 2011/0225424 | A1* | 9/2011 | Zee | H04W 12/04031 |
| | | | | 713/171 |
| 2012/0036363 | A1* | 2/2012 | Langham | H04L 9/0838 |
| | | | | 713/171 |
| 2016/0182458 | A1* | 6/2016 | Shatzkamer | H04L 63/0428 |
| | | | | 713/168 |
| 2017/0126645 | A1* | 5/2017 | Froelicher | H04L 63/08 |
| 2017/0272410 | A1* | 9/2017 | Vaarala | H04L 29/1249 |
| 2017/0359214 | A1* | 12/2017 | Xie | H04L 41/0286 |
| 2017/0374025 | A1 | 12/2017 | Pan | |
| 2019/0281530 | A1* | 9/2019 | Xue | H04L 63/164 |
| 2020/0059370 | A1* | 2/2020 | Abraham | H04L 67/10 |
| 2020/0120078 | A1* | 4/2020 | Mao | H04L 63/0272 |

OTHER PUBLICATIONS

SDIG: Toward Software-Defined IPsec Gateway. Li . IEEE. (Year: 2016).*
CN 103392323. (Year: 2013).*
CN 107835194. (Year: 2018).*
IPSec over Heterogeneous IPv4 and IPv6 Networks: Issues and Implementation. Ahmad et al. IJCNC. (Year: 2012).*
Performance Evaluation of Software Routers with VPN Features. Redzovic. IEEE. (Year: 2016).*
Performance Analysis of Internet Key Exchange Algorithms on IPSec Security Association Initiation. Praptodiyono. ICIEE. (Year: 2018).*
Gustavo Medina, Cisco TAC Engineer, "ASA VPN Load Balancing Master Election Process", Document ID:118078, https://www.cisco.com/c/en/us/support/docs/security/asa-5500-x-series-next-generation-firewalls/118078-technote-vpn-00.html, Aug. 1, 2014, 4 pages.
Cisco Systems, Inc., "CLI Book 1: Cisco ASA Series General Operations CLI Configuration Guide, 9.10", https://www.cisco.com/c/en/us/td/docs/security/asa/asa910/configuration/general/asa-910-general-config.html, Feb. 26, 2019, 1358 pages.
Cisco Systems, Inc., "CLI Book 3: Cisco ASA Series VPN CLI Configuration Guide, 9.10", https://www.cisco.com/c/en/us/td/docs/security/asa/asa910/configuration/vpn/asa-910-vpn-config.html, Apr. 24, 2019, 460 pages.
Kun Tan et al., "Protego: Cloud-Scale Multitenant IPsec Gateway", https://www.usenix.org/conference/atc17/technical-sessions/presentation/son, Jul. 12-14, 2017, 15 pages.
Cisco Systems, Inc., "Security for VPNs with IPsec Configuration Guide, Cisco IOS XE Release 3S", https://www.cisco.com/c/en/us/td/docs/ios-xml/ios/sec_conn_vpnips/configuration/xe-3s/sec-sec-for-vpns-w-ipsec-xe-3s-book/sec-cfg-vpn-ipsec.html, Sep. 2, 2018, 108 pages.
Cisco Systems, Inc., "VPN Availability Configuration Guide", Jul. 11, 2011, 48 pages.
Cisco Systems, Inc., "Setting General VPN Parameters", https://www.cisco.com/c/en/us/td/docs/security/asa/asa83/configuration/guide/config/vpnsysop.pdf, downloaded May 2, 2019, 18 pages.
International Search Report and Written Opinion in counterpart International Application No. PCT/US2020/019423, dated Apr. 20, 2020, 16 pages.
Vajaranta, Markku et al., "Feasibility of FPGA Accelerated IPsec on Cloud", 2018 21st Euromicro Conference on Digital System Design, Aug. 29, 2018, 4 pages.
Son, Jeongseok et al., "Protego: Cloud-Scale Mutitenant IPsec Gateway", 2017 USENIX Annual Technical Conference, Jul. 12, 2017, 13 pages.

* cited by examiner

┌─────────────────────────────────────────────────────────────┐
│ OBTAINING, AT A FIRST DEVICE FROM A CLIENT DEVICE, AN INTERNET KEY │ 505
│ EXCHANGE PROTOCOL MESSAGE INDICATING A FIRST INTERNET PROTOCOL │
│ SECURITY TRAFFIC FLOW IS TO BE ESTABLISHED VIA THE FIRST DEVICE │
└─────────────────────────────────────────────────────────────┘
                              ↓
┌─────────────────────────────────────────────────────────────┐
│ FORWARDING, FROM THE FIRST DEVICE, THE INTERNET KEY EXCHANGE │ 510
│           PROTOCOL MESSAGE TO A SECOND DEVICE                │
└─────────────────────────────────────────────────────────────┘
                              ↓
┌─────────────────────────────────────────────────────────────┐
│ OBTAINING, AT THE FIRST DEVICE FROM A KEY VALUE STORE, AN    │ 515
│ ENCRYPTION KEY USED TO TRANSMIT TRAFFIC VIA THE FIRST INTERNET│
│ PROTOCOL SECURITY TRAFFIC FLOW, WHEREIN THE KEY VALUE STORE IS│
│ POPULATED WITH THE ENCRYPTION KEY IN RESPONSE TO THE SECOND  │
│ DEVICE OBTAINING THE INTERNET KEY EXCHANGE PROTOCOL MESSAGE  │
└─────────────────────────────────────────────────────────────┘
                              ↓
┌─────────────────────────────────────────────────────────────┐
│ OBTAINING, AT THE FIRST DEVICE, A FIRST DATA PACKET TO BE    │ 520
│ TRANSMITTED VIA THE FIRST INTERNET PROTOCOL SECURITY TRAFFIC │
│                           FLOW                                │
└─────────────────────────────────────────────────────────────┘
                              ↓
┌─────────────────────────────────────────────────────────────┐
│ PROVIDING, FROM THE FIRST DEVICE, THE FIRST DATA PACKET      │ 525
│ ENCRYPTED WITH THE ENCRYPTION KEY OF THE FIRST INTERNET      │
│           PROTOCOL SECURITY TRAFFIC FLOW                     │
└─────────────────────────────────────────────────────────────┘

SCALABLE IPSEC SERVICES

CROSS-REFERENCE TO RELATED APPLICATIONS

This application claims priority to U.S. Provisional Patent Application No. 62/812,545, entitled "Scalable IPSec Services," and filed on Mar. 1, 2019. The above application is hereby incorporated by reference herein.

TECHNICAL FIELD

The present disclosure relates to Internet Protocol Security implementations.

BACKGROUND

With the increasing move toward the cloud, service providers may seek to offer highly scalable and highly available, multi-tenant aware Internet Protocol Security (IPSec) gateways in cloud-native environments.

Cloud Native environments are often characterized by the utilization of ephemeral and short lived compute resources. Reliability and redundancy are often provided for in cloud environments by deploying multiple availability zones. Accordingly, scaling of such resources is often provided through horizontal scaling (e.g., providing additional host devices or additional virtual machines (VMs) to scale the resources).

Such environments may provide challenges as typical IPSec deployments are long-lived and rely on stable and reliable compute resources that are often scaled vertically (e.g., increasing the compute resource of a single host device or virtual machine). In other words, IPSec implementations may utilize compute resources in ways that differ from how such resources are often provided in cloud environments Traditionally, highly available and highly reliable IPSec services were provided by building IPSec gateways in a High Available (HA) pair, with one active master and a standby slave node. Depending on the required reliability, it is not uncommon to deploy dedicated pairs for a tenant. Such implementations may result in waste or idle compute resources, as one half of the pair is held in reserve in case of a failure of the other half of the pair. Accordingly, such implementations may be costly to scale and operate.

Given the complexity of IPSec and its long-lived stateful nature, scaling IPSec gateways is typically implemented through vertical scaling, by deploying the IPSec gateways on more powerful VMs or compute nodes. When implementing a multi-tenant IPSec gateway servicing many tenants, the service is limited to compute resources of a single VM or compute node. Such implementations may make it difficult to scale a multi-tenant IPSec gateway. Furthermore, such gateways may be over-provisioned, making such implementations expensive in cost and resources. Such deployments may also suffer from a hard capacity maximum as determined by the number of CPU resources in a single compute resource.

Cloud native environments are by their nature very dynamic, and the underlying compute resources are typically less reliable than traditional dedicated IPSec gateways. Compute, Datacenter or Availability zone failures will affect the reachability of the IPSec gateway and will result in service outages for the IPSec service.

DESCRIPTION OF EXAMPLE EMBODIMENTS

Overview

Methods, an apparatus and computer readable media are provided which may be used to establish IPSec implementations that separate the IKE and ESP functionality. According to one such method, an Internet Key Exchange protocol message indicating a first Internet Protocol Security traffic flow is to be established via a first device is obtained at the first device. The Internet Key Exchange protocol message is forwarded from the first device to a second device. An encryption key used to transmit traffic via the first Internet Protocol Security Traffic flow is received at the first device from a key value store. The key value store is populated with the encryption key in response to the second device obtaining the first Internet Key Exchange protocol message. A first data packet to be transmitted via the Internet Protocol Security traffic flow is obtained at the first device. The first device provides the first data packet encrypted with the encryption key of the first Internet Protocol Security traffic flow.

Example Embodiments

Figure 1A:
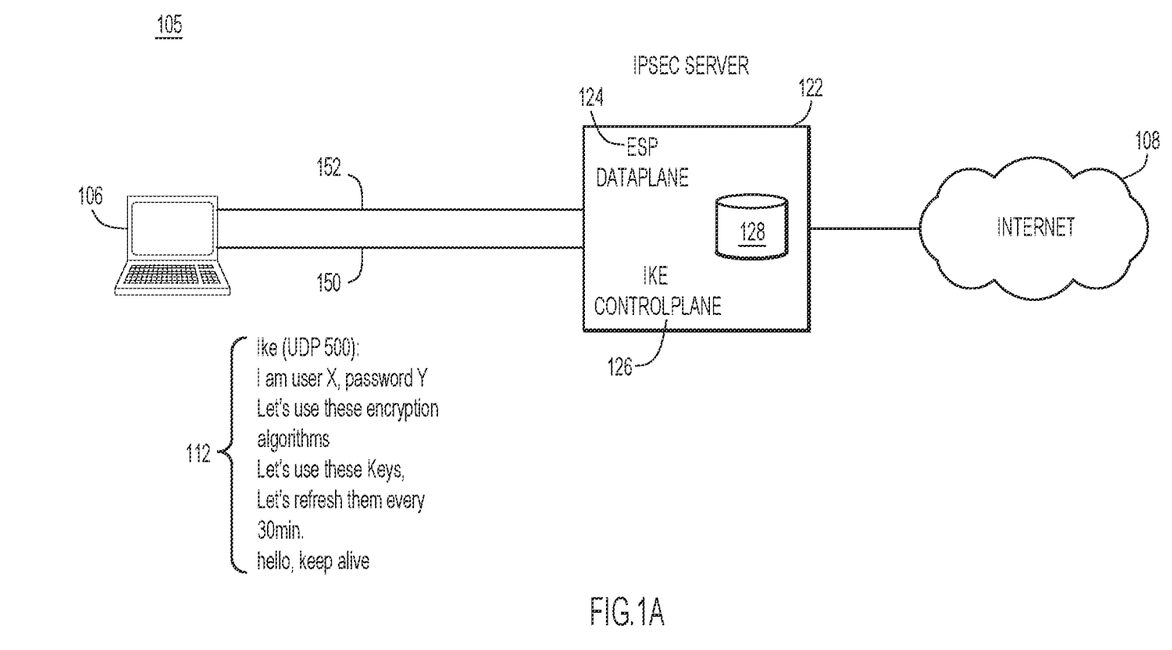
FIGS. 1A-1C illustrate a plurality of IPSec architecture implementations, according to example embodiments.
Figure 1B:
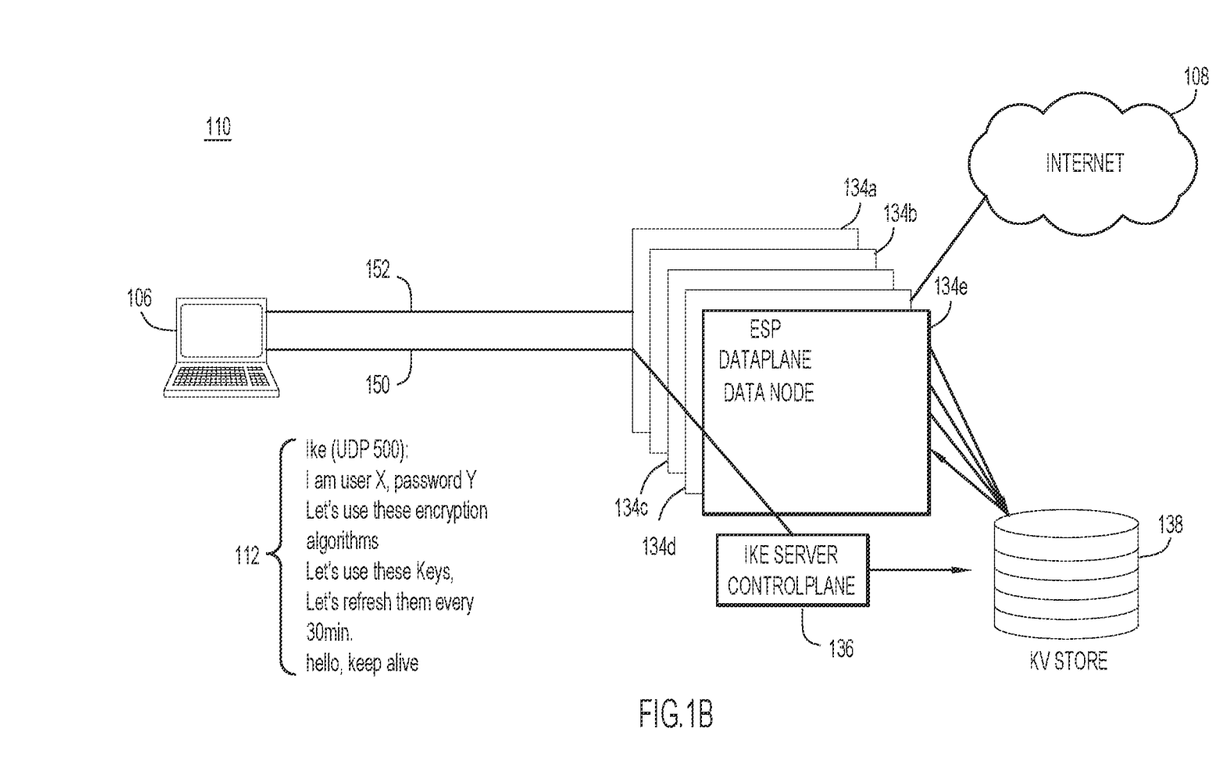
Figure 1C:
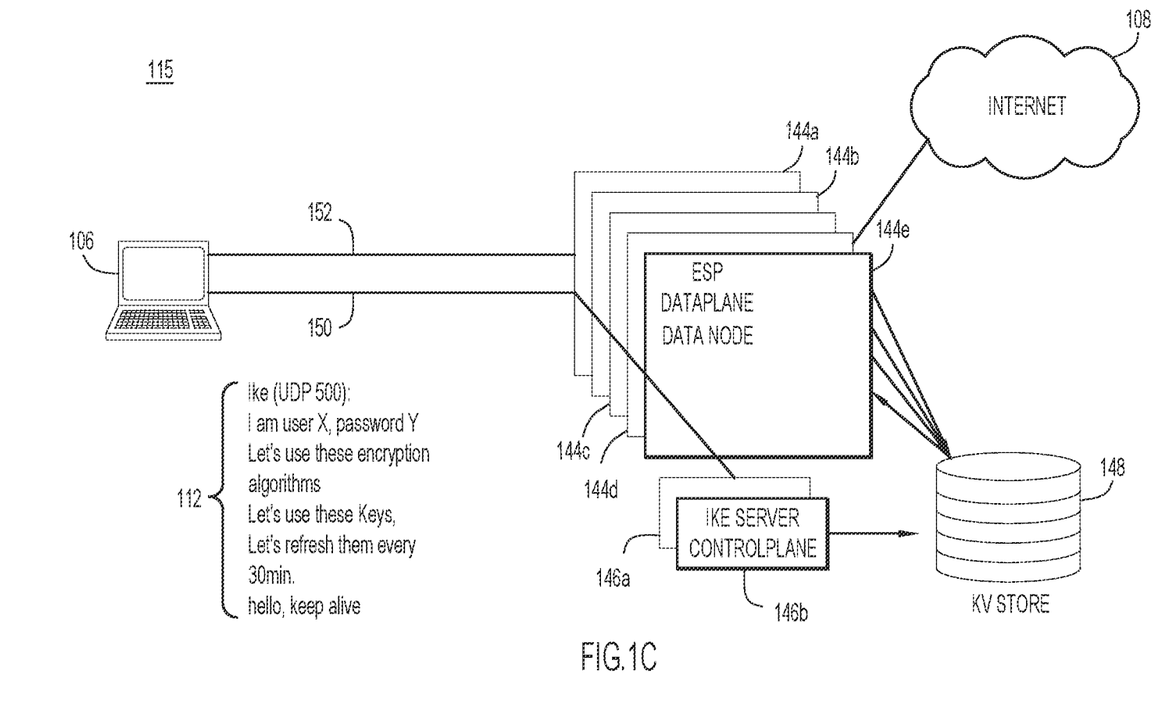

With reference made to FIGS. 1A, 1B and 1C, depicted therein is a comparison of IPSec architectures 105, 110 and 115 that may be used to send secure traffic between client 106 and Internet or cloud environment 108. Architectures 110 and 115 implement the techniques of the present disclosure and may provide the following functionality:

1. Separating the Internet Key Exchange (IKE) and Encapsulating Security Payload (ESP) functions of IPSec,
2. Leveraging Anycast and Equal Cost Multipath (ECMP) routing for IPSec,
3. Just in Time provisioning of ESP keys, and/or
4. Just-in-Time handling of IKE traffic which is distributed using a key/value store.

Through this functionality, example embodiments may provide globally scalable multi-tenant IPSec services with minimal downtime and massive scaling properties. Specifically, through the techniques disclosed herein, both of the IKE and ESP functionality of IPSec implementations may be scaled horizontally. Furthermore, the IKE and ESP functionality may be scaled independently from each other.

IPSec gateways, e.g., a gateway combining the IKE and ESP functionality, are challenging to scale, and typically operators will scale IPSec gateways vertically by increasing the compute resources of the device on which both of the IKE and ESP functionality are executing. Vertical scaling is utilized for IPSec gateways because IPSec sessions are long-lived (hours to days and possibly even weeks). The stateful nature of IPSec makes it difficult to deploy in a cloud-native environment where machines can go down with little notice, and the deployment needs to scale elastically.

The techniques of the present disclosure provide for horizontal scaling of IPSec gateways, and also provide for independent horizontal scaling of the IKE and ESP functionality. Accordingly, the techniques of the present disclosure provide elastic scaling of the IPSec dataplane, and may resolve the problems that often come with a multitenant setup implementing IPSec. Furthermore, the techniques of the present disclosure provide independent horizontal scaling of the IKE and ESP functionality while optimizing compute resources. For example, the techniques of the present disclosure may eliminate the need for (and the associated cost of) passive standby nodes that may be required in related art IPSec configurations. Finally, the techniques of the present disclosure may also provide for global IP mobility, allowing the IP addresses of the IPSec gateways to move globally between datacenters in a deterministic multi-stage approach.

IPSec is a suite of various protocols, most notably the control plane IKE protocol and the dataplane ESP protocol. As illustrated through IKE protocol packet 150 and pseudo-code 112 of FIGS. 1A-C, the IKE protocol serves as the control plane for IPSec via which encryption keys and key refresh rates for IPSec data transfers are determined. ESP is the protocol that is used to transfer the encrypted data packets 152. Both protocols have separate operational challenges and different scaling properties.

Typical IPSec gateway deployments operate the IKE and ESP function on the same host as illustrated in FIG. 1A. This presents challenges for resolving the different and competing scaling properties of IKE and ESP. As illustrated in architecture 105 of FIG. 1A, the IPSec gateway is embodied in a single compute node or virtual machine 122. Specifically, the ESP module 124, the IKE module 126 and the security associations database 128 all execute within the same compute node or virtual machine 122. Accordingly, because the IKE module 126 and security associations database 128 reside in the same compute node or virtual machine 122 as the ESP module 124, the ESP module 124 does not horizontally scale (i.e., increasing the number of ESP modules), and instead, ESP module 124 is scaled vertically (i.e., by increasing the compute resources of compute node or virtual machine 122). The IKE module 126 is also scaled vertically as opposed to horizontally.

By separating the control plane IKE function from the dataplane ESP function, IPSec gateway scaling issues may be resolved separately. For example, as illustrated in IPSec architecture 110 of FIG. 1B, IKE server 136 has been separated from the ESP data nodes 134a-e. The horizontal scaling of the ESP modules 134a-e is facilitated through key-value (KV) store 138. KV store 138 includes all ESP session data, essentially replacing security associations database 128 of FIG. 1A. By separating the IKE server 136 from the ESP dataplane, and providing the independent KV store 138, the ESP dataplane may be scaled horizontally, resulting in a plurality of ESP hosts, embodied in IPSec architecture 110 as ESP data nodes 134a-e.

ESP is well suited to scale horizontally and allows for node migration as it may leverage the IKE protocol to initiate rekeys after a node migration. Low cost, fast, stateless ECMP may be used to load balance ESP traffic to an elastic cluster of ESP nodes 134a-e and ESP sessions may be moved between ESP nodes 134a-e as needed. Specifically, ESP data packets 152 may be sent to any of ESP data nodes 134a-e, as the IKE data associated with the ESP traffic is accessed via IKE server 136 and KV store 138. If any one of ESP data nodes 134a-e fails, the remaining ESP data nodes still have access to the IKE data facilitated by IKE server 136 and KV store 138.

Figure 2:
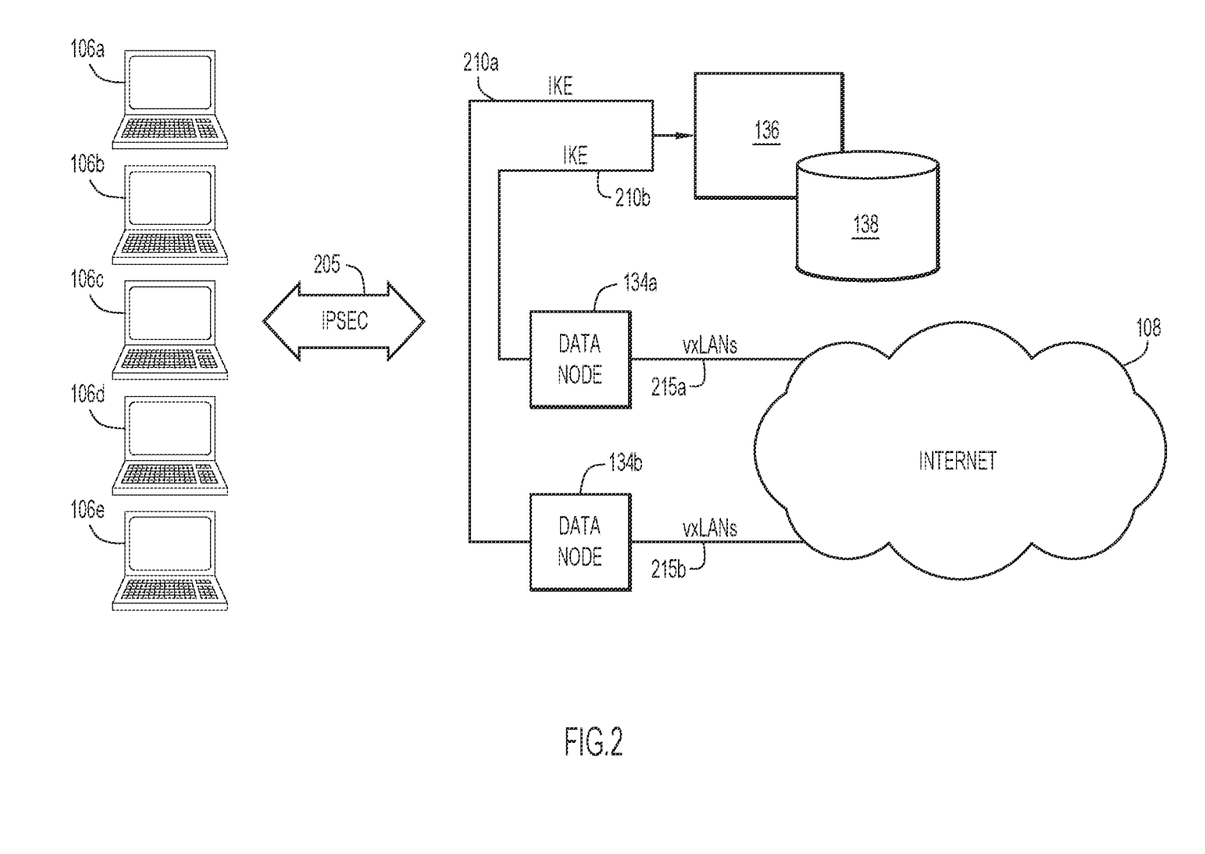
FIG. 2 illustrates an IPSec architecture in which the architecture elements implementing the Encapsulating Security Payload protocol have been horizontally scaled, according to example embodiments.

With reference made to FIG. 2, depicted therein is a process flow for IPSec traffic in an environment like architecture 110 of FIG. 1B. When IPSec traffic 205 of a new dataflow is received at ESP data nodes 134a or 134b from a client 106a-e, the traffic is initially sent to IKE node 136 via IKE traffic 210a or 210b to establish the necessary ESP session keys, which are stored in KV store 138. The ESP data node 134a or 134b that received the first ESP packet of a data flow will locally story the session keys and ESP state and policies for the data flow. These keys may be used to transmit secure ESP traffic via, for example, virtual extensible local area networks (VXLANs) 215a and 215b, to the Internet or cloud environment 108. If packets for the same session are subsequently received at a different one of ESP data nodes 134a or 134b, the receiving ESP data node 134a or 134b may retrieve the appropriate session keys and ESP state from KV store 138. In other words, because an alternate ESP data node 134a or 134b may receive session keys and ESP state from KV store 138, the ESP protocol functionality of IPSec may be scaled horizontally in an environment like that illustrated in FIG. 2 or as illustrated in architecture 110 of FIG. 1B.

Traffic may be sent to either of ESP data node 134a or 134b through the use of Anycast and/or ECMP routing. For example, ECMP routing may be used to appropriately load balance traffic between ESP data nodes 134a and 134b. Similarly, if one of data nodes 134a or 134b crashes or is otherwise unable provide ESP services, ECMP routing may be used to direct traffic to the other of data nodes 134a and 134b in a manner that is completely transparent to clients 106a-e.

IKE may also be scaled horizontally according to the techniques of the present disclosure. For example, as illustrated in IPSec architecture 115 of FIG. 1C, the use of KV store 148 allows for the separation of ESP data nodes 144a-e from IKE servers 146a and 146b, and for the horizontal scaling of IKE servers 146a and 146b. Specifically, KV store 148 is maintained separately from all of IKE servers 146a and 146b while all of IKE servers 146a and 146b have access to the IKE data contained in KV store 148. If either one of IKE servers 146a or 146b goes down, the remaining IKE server(s) may access the data contained in KV store 148 to continue servicing the IPSec gateway, and thus allowing for seamless IKE session migration between nodes. ECMP may be used to reroute traffic to an operating IKE server 146a or 146b in the event the previously utilized IKE server is taken out of operation.

Figure 3:
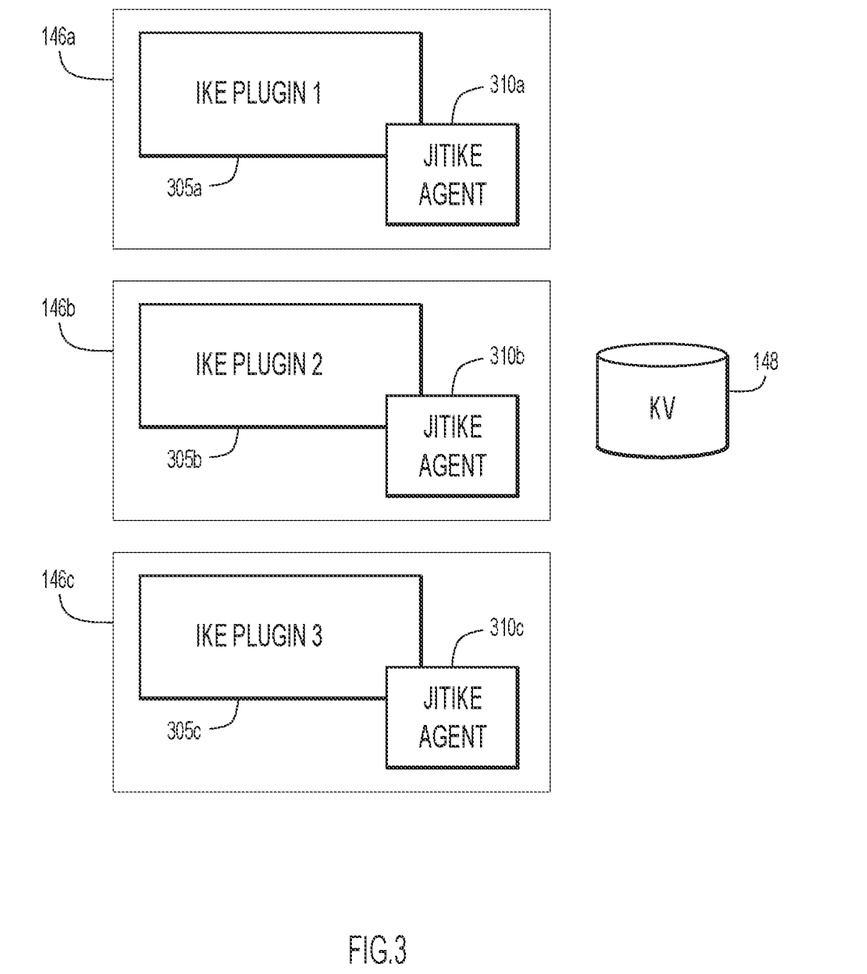
FIG. 3 illustrates an IPSec architecture in which the architecture elements implementing the Internet Key Exchange protocol have been horizontally scaled, according to example embodiments.

According to one specific example embodiment, as illustrated in FIG. 3, IKE functionality may be implemented on each of IKE servers 146a-c through an IKE plugin 305a-c. Specific example embodiments of IKE plugins 305a-c include plugins implementing the StrongSwan Open Source IPsec-based Virtual Private Network (VPN) solution for Linux and other UNIX based operating systems. According to some example embodiments, IKE plugins 305a-c speak with a High Availability (HA) Application Programming Interface (API) 310a-c (also referred to herein as a Just-in-Time IKE Agent (JITIKE Agent)) and the KV store 148 through, for example, a Charon Security Associations manager, on one side, and to KV store 148 on the other side. According to other example embodiments, the HA APIs 310*a-b* may not be required. In such example embodiments, the IKE plugins 305*a-c* operate independently to handle IKE sessions "just in time" without ever interacting with each other. In these embodiments without the HA APIs 310*a-c*, the IKE plugins 305*a-c* may be treated as "cattle" (i.e., if a one of the plugins experiences errors or fails, it is killed and replaced with another instance of the plugin).

The separate communication between IKE servers 146*a-c* and KV store 148 allows for storing all IKE session data in the KV store 148, meaning failover of IKE sessions may be implemented across many different nodes, and scaling of the IKE servers may be done horizontally. In other words, if one or more of IKE servers 146*a-c* fails or is otherwise taken out of service, the remaining operating IKE servers 146*a-c* may continue to service IPSec traffic, including existing traffic flows, as all IKE session data is stored in KV store 148, not stored at individual ones of IKE servers 146*a-c*. ECMP may be utilized to ensure that traffic being sent from data nodes (such as data nodes 134*a-e* of FIG. 1B, data nodes 144*a-e* of FIG. 1C and/or data nodes 134*a* and 134*b* of FIG. 2) to IKE servers 146*a-c* is routed to an operating IKE server 146*a-c*. By communicating with KV store 148, the operational IKE servers 146*a-c* may retrieve the state, security associations, and other data necessary for IKE servers 146*a-c* to continue servicing existing and new IPSec traffic flows.

According to the example embodiments that implement HA APIs 310*a-c*, the HA APIs 310*a-c* may act as passive slave agents. The IKE plugins 305*a-c* sync with the HA APIs 310*a-c* using a User Datagram Protocol (UDP) HA protocol. Though, such processing is unnecessary in example embodiments in which the IKE Plugins 305*a-c* are configured to communicate directly with KV store 148. The IKE traffic transmitted between the HA APIs 310*a-c*, or directly from the IKE plugins 305*a-c*, and KV store 148 may be encrypted.

Accordingly, the techniques of the present disclosure may be used to successfully separate the IKE and ESP functions of IPSec. Furthermore, the techniques of the present disclosure may leverage the separation of the IKE and ESP functions. For example, an IPSec client will send traffic to a single IPSec server Internet Protocol (IP) address, but the client is actually sending traffic via the IP address for a globally anycasted ESP cluster. For example, returning to FIGS. 1B and 1C, when client 106 sends ESP traffic, the traffic will all be addressed the same, regardless of which of ESP nodes 134*a-e* or 144*a-e* is servicing the traffic flow. Similarly, the ESP cluster comprised of ESP nodes 134*a-e* or 144*a-e* may forward the IKE traffic to the IKE cluster (comprised of IKE node 136 in FIG. 1B or IKE nodes 146*a* and a46*b* of FIG. 1C) using a single address.

The techniques of the present disclosure also allow for Just-in-Time provisioning of IPSec keys. For example, once an IPSec session is established by the IKE protocol, subsequent ESP packets will reach one of the many ESP nodes in a global cluster. The ESP node will do a lookup by using a signaling service that retrieves the required ESP keys and traffic selector policies. The ESP keys and traffic selector policies will then be installed on the receiving ESP node in a Just-In-Time manner. Said differently, even if an IPSec traffic flow is established at a first of a cluster of ESP data nodes, such as data nodes 134*a-e* or 144*a-e* of FIG. 1B or 1C, any one of the other ESP data nodes in the cluster may service the ESP traffic by retrieving the necessary security associations from the KV store, such as KV stores 138 and 148 of FIGS. 1B and 1C, respectively.

The techniques of the present disclosure also allow for the leveraging of Anycast and ECMP for IPSec. Specifically, using the techniques of the present disclosure, ESP nodes may be taken in and out of a cluster. If an ESP node disappears out of the available pool, Anycast and ECMP will automatically and in a stateless manner map the ESP packet to the next available ESP node, either in the same datacenter, or even in a next available datacenter, providing global failover functionality. When ESP traffic for locally unknown ESP security associations arrives on an ESP node, the ESP node will do a Just-in-Time lookup in the independent KV store, retrieving the session properties such as ESP keys and traffic selectors as described above. Accordingly, the techniques of the present disclosure may provide for global ESP session migration and massive horizontal scaling opportunities without interruption to the IPSec client session.

Figure 4:
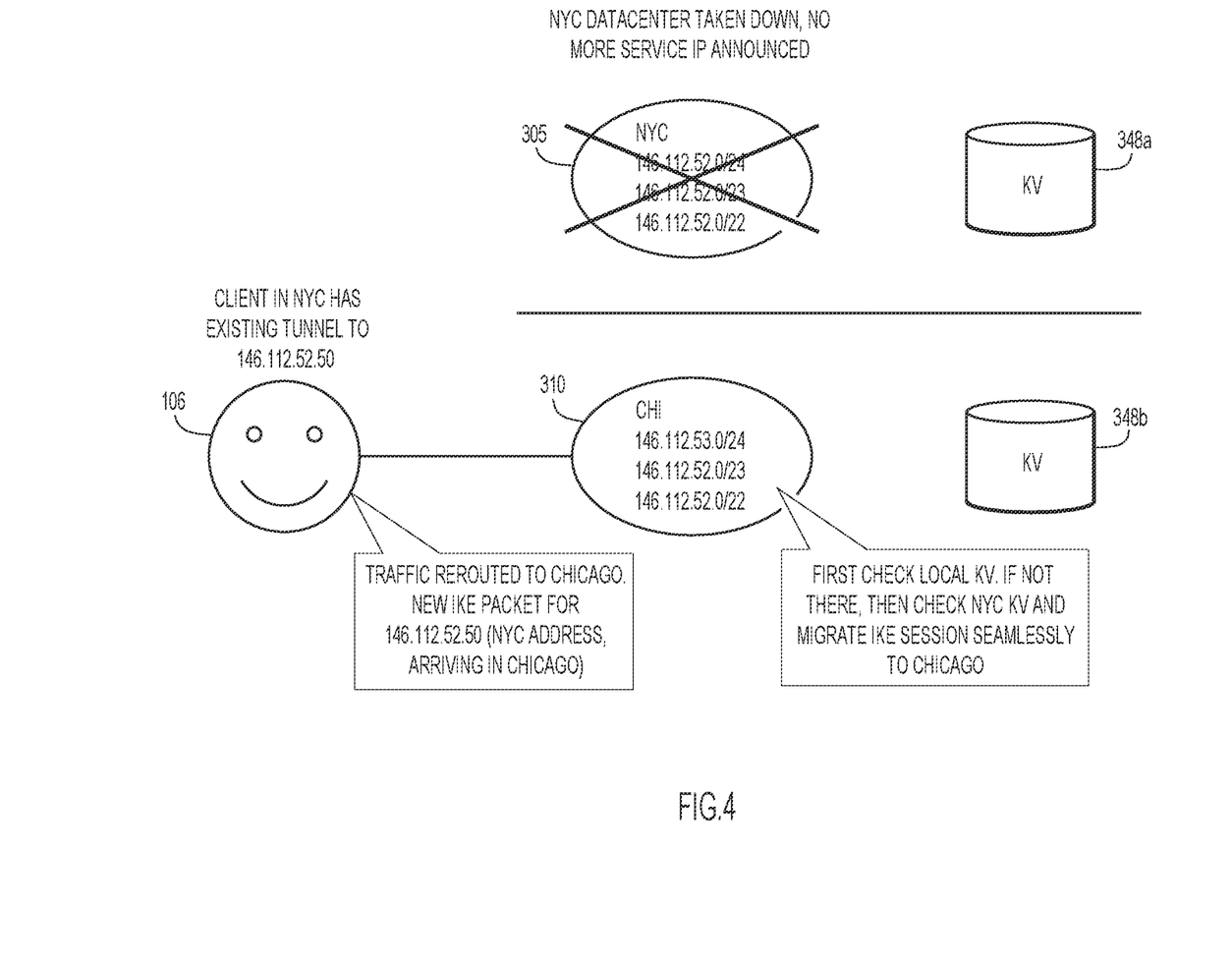
FIG. 4 illustrates a process flow for providing IPSec failover across datacenters, according to example embodiments.

An example embodiment of leveraging a multi-stage anycast setup to allow for inter-datacenter failover, providing global load balancing and redundancy, is illustrated in FIG. 4. Specifically, an IPSec client 106 connects to the IPSec gateways with a destination IP address of 146.112.52.50. The Border Gateway Protocol (BGP) prefix for the IPSec gateway 146.112.52.50 is announced to the Internet using BGP as 146.112.52.0/24 out of datacenter 305, which in the example of FIG. 4 is located in New York City. The supernet prefix 146.112.52.0/23 (which also contains the IP for the IPSec gateway 146.112.52.50), is announced out of datacenter 310, which is located in Chicago. This means that when datacenter 305 becomes unavailable, traffic for the IPSec gateway with IP address 146.112.52.50 is automatically rerouted to datacenter 310 where it can be serviced by the IPSec gateway there. Specifically, if datacenter 310 has access to KV store 348*a* of datacenter 305, it can migrate the ESP sessions from datacenter 305 to datacenter 310 and into KV store 348*b*. This model of providing datacenter failover scales out further to additional locations that announce, for example, the supernet prefix 146.112.52.0/22 and the supernet prefix 146.112.52.0/21, respectively. Since BGP follows the most specific prefix, traffic will route to the next active datacenter. Should that datacenter become unavailable, the IP address for the IPSec gateway prefix will automatically be available in the next datacenter, with the KV store data migrating between datacenters. The example above is an example of a 4-stage failover (i.e., utilizing supernet prefixes 146.112.52.0/21, 146.112.52.0/22, 146.112.52.0/23 and 146.112.52.0/24), but this model may scale as far as needed (e.g., by using additional supernet prefixes) and is only limited by the IP addresses available.

Because the techniques of the present disclosure separate out IKE and ESP into different nodes, the techniques rely on a KV store to handle state. This allows for the scaling of the KV store independently, and the scaling of a KV store is a problem already solved in related art that is outside the scope of the present disclosure.

Figure 5:
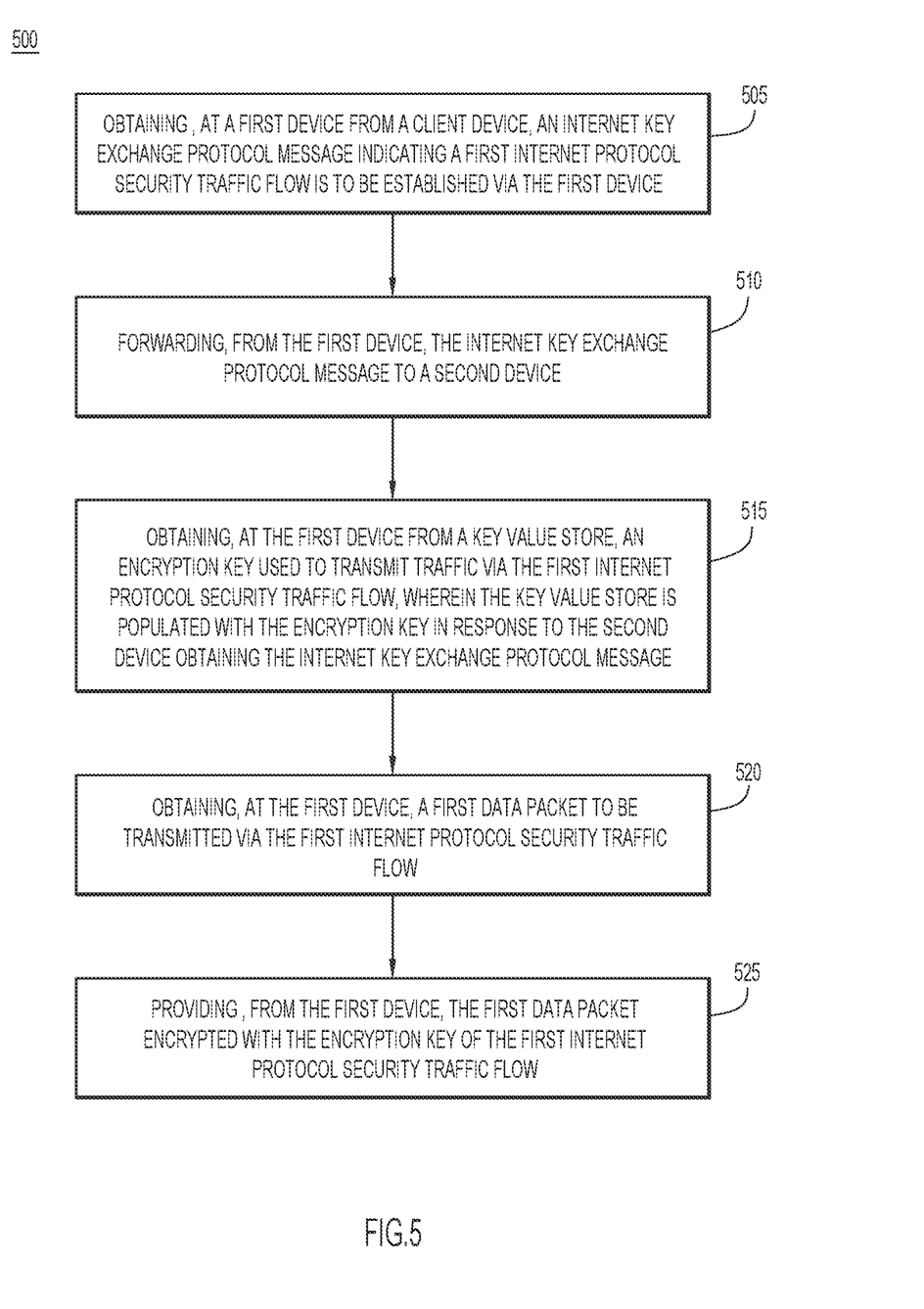
FIG. 5 illustrates a process for providing scalable IPSec services according to the techniques of the present disclosure, according to example embodiments.

With reference now made to FIG. 5, depicted therein is a flowchart 500 illustrating a process according to the techniques presented herein. The process beings in operation 505 in which an IKE protocol message is obtained at a first device. The IKE protocol message indicates that a first IPSec traffic flow is to be established by the first device. For example, the first device may be embodied as an ESP node, such as ESP data nodes 134*a-e* of FIG. 1B, ESP data nodes 144*a-e* of FIG. 1C, and/or ESP data nodes 134*a* and 134*b* of FIG. 2.

In operation 510, the IKE protocol message is forwarded from the first device to a second device. For example, the second device may be embodied as an IKE node, such as IKE control node 136 of FIG. 1B, IKE control nodes 146*a* and 146*b* of FIG. 1C, and/or IKE control nodes 146*a-c* of FIG. 3.

In operation 515 an encryption key used to transmit traffic via the first IPSec traffic flow is received at the first device from a KV store. The KV store is populated in response to the second device obtaining the IKE protocol message. For example, the KV store may be embodied as a KV store as discussed above with reference to FIGS. 1B, 1C and 2-4.

In operation 520, a first data packet is obtained at the first device to be transmitted via the first IPSec traffic flow. Finally, in operation 525, the first data packet is provided to the first IPSec traffic flow using encryption provided by the encryption key.

One specific example embodiment of the process of flowchart 500 may take the form of the following call flow:

An IKE packet is obtained at an ESP data node from a client device.

The IKE packet is provided to the IKE server/control node.

The IKE server/control node handles IKE packet, establishing the IPSec session.

The IKE server/control node stores IKE session information in KV store.

A first ESP packet arrives on the ESP data node.

ESP data node reads key information from KV store and programs the data node for the ESP session.

The first ESP packet is transmitted or provided from the ESP data node as part of the ESP session.

Embodiments of the process of flowchart 500 may also include the following additional operations. Specifically, when an ESP data node with an active session goes down (i.e., fails or is otherwise removed from service), the following operations may commence:

ECMP routing redirects ESP data traffic to a new ESP data node.

The new ESP data node that receives the ESP data traffic does not have the encryption key associated with the ESP data.

The ESP data node requests the IKE server to rekey the ESP keys.

The ESP data node obtains from the KV store the new ESP information, and installs the ESP information, such as the rekeyed encryption key, into the kernel of the ESP data node.

The new ESP data node assumes servicing of the ESP session.

When an IKE server/control node fails or is otherwise removed from operation, example embodiments of the process of flowchart 500 may include the following operations:

The IKE server/control node receives IKE traffic for an unknown session.

The IKE server/control node performs a look-up in the KV store for session data associated within the unknown session If the data associated with the unknown session is found in the KV store, data is obtained at the IKE server/control node where it is installed locally.

The IKE server/control node assumes servicing of the previously unknown IKE session.

Accordingly, provided for herein are distributed IPSec implementations using KV stores which separate the IKE and ESP hosts, allowing each type of host to scale separately and horizontally.

The techniques presented herein specifically separate out IKE and ESP, resulting in different nodes handling IKE and ESP. A tunnel is installed on the node where IPSec traffic arrives, thereby having that node take over the tunnel. Any node can handle any session at any time, making this a fully elastic IPSec VPN service. Moreover, the IKE and ESP nodes may be completely stateless. The KV store may store all the states for the ESP and IKE sessions, thus allowing failure or migration of both IKE and ESP sessions across a variety of nodes. While the KV store will maintain state for IKE and ESP sessions, IKE control nodes and ESP data nodes may maintain local copies of the session states. Furthermore, on IKE control nodes, the techniques of the present disclosure detect when a given IKE session is not handled locally. The IKE session information is obtained from the KV store, and the session is programmed locally, all without interrupting the client side. Likewise, an existing ESP session can be detected on an ESP node, the session data obtained from the KV store, and programmed locally in the ESP node, with only a rekey involved.

The combination of the above described techniques allows to the implementation of an anycast-based VPN service, permitting failover of IKE and ESP sessions across datacenters and regions as required, bringing a truly cloud-native VPN service to life.

Figure 6:
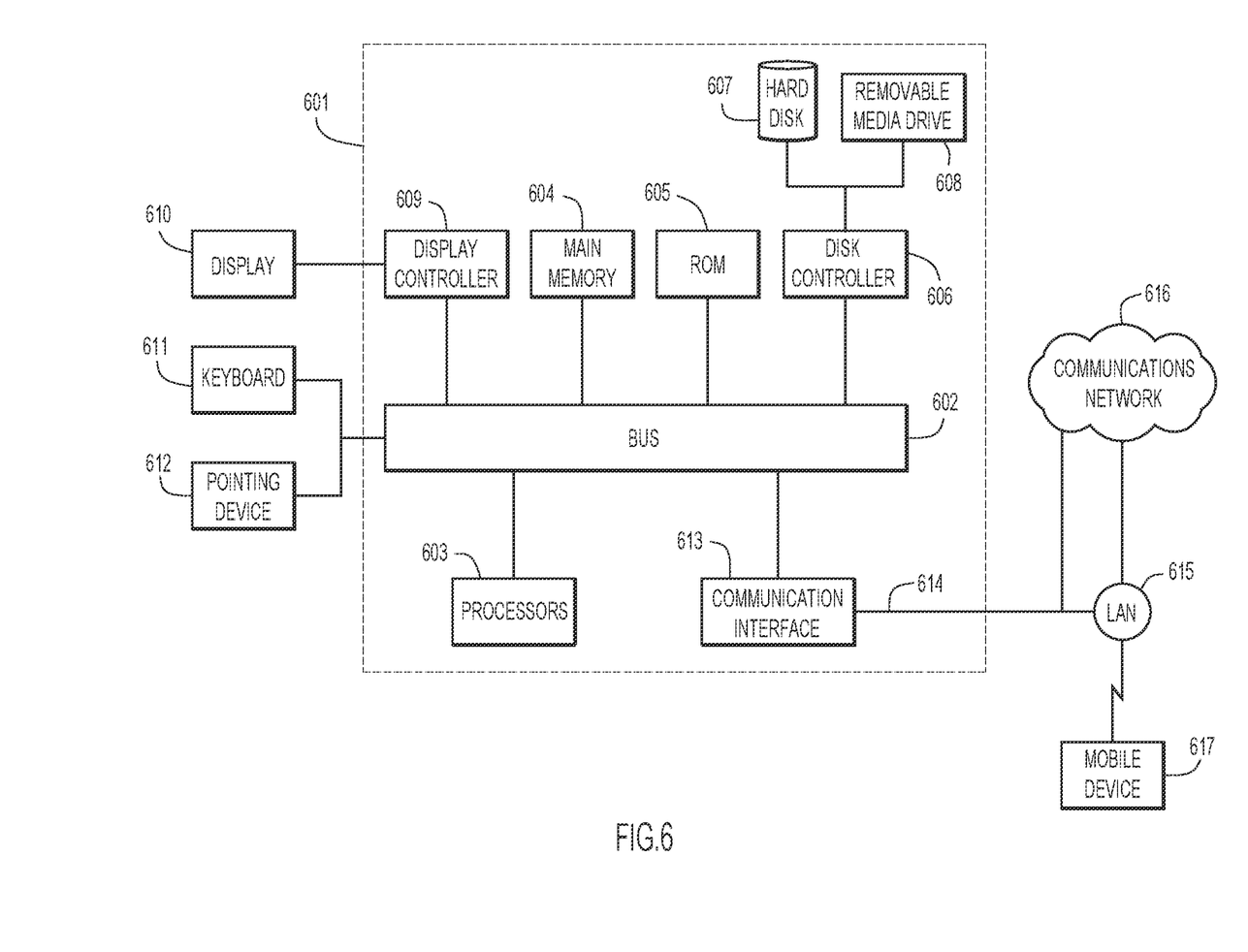
FIG. 6 is a functional block diagram of an apparatus configured to implement the techniques of the present disclosure, according to example embodiments.

With reference now made to FIG. 6, depicted therein is an apparatus configured to implement the techniques of the present disclosure. Specifically, illustrated in FIG. 6 is an apparatus that may be configured to implement any of the functions described above with regard to an ESP data node/server, an IKE server/control node, and/or a KV store as described above with reference to FIGS. 1-5, as well as datacenter elements as described with reference to FIG. 4. FIG. 6 illustrates a computer system 601 upon which the embodiments presented may be implemented. The computer system 601 may be programmed to implement a computer based device. The computer system 601 includes a bus 602 or other communication mechanism for communicating information, and a processor 603 coupled with the bus 602 for processing the information. While the figure shows a single block for a processor, it should be understood that the processors 603 represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk or solid state drive 607, and a removable media drive 608 (e.g., floppy disk drive, read-only compact disc drive, read/write compact disc drive, removable magneto-optical drive and optical storage drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA), or any other technologies now known or hereinafter developed.

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a Liquid Crystal Display (LCD), Light Emitting Diode (LED) display, or other now known or hereinafter developed display technologies, for displaying information to a computer user. The computer system 601 includes input devices, such as a keyboard 611 and a pointing device 612, for interacting with a computer user and providing information to the processor 603. The pointing device 612, for example, may be a mouse, a trackball, a pointing stick or a touch-pad, for communicating direction information and command selections to the processor 603 and for controlling cursor movement on the display 610. The display 610 may be a touch-screen display.

The computer system 601 performs a portion or all of the processing steps of the process in response to the processor 603 executing one or more sequences of one or more instructions contained in a memory, such as the main memory 604. Such instructions may be read into the main memory 604 from another computer readable medium, such as a hard disk or solid state drive 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the process, and for enabling the computer system 601 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, provided for herein are methods that comprise: obtaining, at a first device, an Internet Key Exchange protocol message indicating a first Internet Protocol Security traffic flow is to be established via the first device; forwarding, from the first device, the Internet Key Exchange protocol message to a second device; obtaining, at the first device from a key value store, an encryption key used to transmit traffic via the first Internet Protocol Security Traffic flow, wherein the key value store is populated with the encryption key in response to the second device obtaining the Internet Key Exchange protocol message; obtaining, at the first device, a first data packet to be transmitted via the first Internet Protocol Security traffic flow; and providing, from the first device, the first data packet encrypted with the encryption key of the first Internet Protocol Security traffic flow.

Also provided for herein is an apparatus that includes one or more processors and one or more network interfaces configured to communicate over a network. The one or more processors are configured to: obtain, via the one or more network interfaces, an Internet Key Exchange protocol message indicating a first Internet Protocol Security traffic flow is to be established via the apparatus; forward, via the one or more network interfaces, the Internet Key Exchange protocol message to a first device; obtain, at the apparatus from a key value store via the one or more network interfaces, an encryption key used to transmit traffic via the first Internet Protocol Security Traffic flow, wherein the key value store is populated with the encryption key in response to the first device obtaining the first Internet Key Exchange protocol message; obtain, via the one or more network interfaces, a first data packet to be transmitted via the Internet Protocol Security traffic flow; and provide, from the apparatus via the one or more network interfaces, the first data packet encrypted with the encryption key of the first Internet Protocol Security traffic flow.

Also according to the techniques of the present disclosure are non-transitory computer readable media encoded with instructions. When the instructions are executed by a processor, the instructions are operable to: obtain, at a first device, an Internet Key Exchange protocol message indicating a first Internet Protocol Security traffic flow is to be established via the first device; forward, from the first device, the Internet Key Exchange protocol message to a second device; obtain, at the first device from a key value store, an encryption key used to transmit traffic via the first Internet Protocol Security Traffic flow, wherein the key value store is populated with the encryption key in response to the second device obtaining the Internet Key Exchange protocol message; obtain, at the first device, a first data packet to be transmitted via the first Internet Protocol Security traffic flow; and provide, from the first device, the first data packet encrypted with the encryption key of the first Internet Protocol Security traffic flow.

Through the techniques of the present application, a distributed IPSec implementation may be established using a key/value store that also separates IKE and ESP, allowing each to scale separately.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining, at a first device comprising an Encapsulating Security Payload protocol data node, an Internet Key Exchange protocol message indicating a first Internet Protocol Security traffic flow is to be established via the first device;
forwarding, from the first device, the Internet Key Exchange protocol message to a second device comprising an Internet Key Exchange control node;
obtaining, at the first device from a key value store executing at a third device, an encryption key used to transmit traffic via the first Internet Protocol Security Traffic flow, wherein the key value store is populated with the encryption key in response to the second device obtaining the Internet Key Exchange protocol message via a message exchange between the second device and the third device;
obtaining, at the first device, a first data packet to be transmitted via the first Internet Protocol Security traffic flow; and
providing, from the first device, the first data packet encrypted with the encryption key of the first Internet Protocol Security traffic flow.

2. The method of claim 1, wherein the Encapsulating Security Payload protocol data node comprises a first of a plurality of Encapsulating Security Payload protocol data nodes, and wherein the first device obtains the Internet Key Exchange protocol message via Equal Cost Multipath routing.

3. The method of claim 2, further comprising:
obtaining, at the first device, a second data packet of a second Internet Protocol Security traffic flow, wherein the key value store was previously populated with a second encryption key for the second Internet Protocol Security traffic flow via a second Encapsulating Security Payload protocol data node of the plurality of Encapsulating Security Payload protocol data nodes;
obtaining, at the first device from the key value store, the second encryption key; and
providing, from the first device, the second data packet encrypted with the second encryption key via the second Internet Protocol Security traffic flow.

4. The method of claim 3, further comprising providing to the second device a request to rekey the second Internet Protocol Security traffic flow, and wherein obtaining the second encryption key from the key value store comprises obtaining the second encryption key provided to the key value store in response to the request to rekey the second Internet Protocol Security traffic flow.

5. The method of claim 1, wherein the Internet Key Exchange control node comprises a first of a plurality of Internet Key Exchange control nodes, wherein each of the plurality of Internet Key Exchange control nodes is configured to populate the key value store.

6. The method of claim 5, wherein the key value store maintains encryption keys for a plurality of Internet Protocol Security traffic flows, and wherein the key value store may be accessed by each of the plurality of Internet Key Exchange control nodes.

7. The method of claim 1, wherein the first device is arranged within a first compute cluster, the method further comprising:
obtaining, at the first device, a second Internet Key Exchange protocol message associated with a second Internet Protocol Security traffic flow;
forwarding, from the first device, the Internet Key Exchange protocol message to the second device;
obtaining, at the first device from a second key value store, a second encryption key used to transmit traffic via the second Internet Protocol Security traffic flow, wherein the second key value store was previously populated via a device associated with a second compute cluster;
obtaining, at the first device, a second data packet to be transmitted via the second Internet Protocol Security traffic flow; and
providing, from the first device, the second data packet associated with the second Internet Protocol Security traffic flow encrypted with the second encryption key used to transmit traffic via the second Internet Protocol Security traffic flow.

8. An apparatus comprising:
a network interface configured to communicate over a network; and
one or more processors, wherein the one or more processors are configured to perform operations on behalf of a first device comprising an Encapsulating Security Payload protocol data node, the operations including:
obtain, at the first device via the network interface, an Internet Key Exchange protocol message indicating a first Internet Protocol Security traffic flow is to be established via the apparatus;
forward, via the network interface, the Internet Key Exchange protocol message to a second device comprising an Internet Key Exchange control node;
obtain, at the first device via the network interface from a key value store executing at a third device, an encryption key used to transmit traffic via the first Internet Protocol Security Traffic flow, wherein the key value store is populated with the encryption key in response to the second device obtaining the Internet Key Exchange protocol message via a message exchange between the second device and the third device;
obtain, at the first device via the network interface, a first data packet to be transmitted via the first Internet Protocol Security traffic flow; and
provide, via the network interface, the first data packet encrypted with the encryption key of the first Internet Protocol Security traffic flow.

9. The apparatus of claim 8, wherein the Encapsulating Security Payload protocol data node comprises a first of a plurality of Encapsulating Security Payload protocol data nodes; and
wherein the one or more processors are configured to obtain the first data packet via Equal Cost Multipath routing.

10. The apparatus of claim 9, wherein the one or more processors are further configured to:
obtain, via the network interface, a second data packet of a second Internet Protocol Security traffic flow, wherein the key value store was previously populated with a second encryption key for the second Internet Protocol Security traffic flow via a second Encapsulating Security Payload protocol data node of the plurality of Encapsulating Security Payload protocol data nodes;
obtain, via the network interface from the key value store, the second encryption key; and
provide, via the network interface, the second data packet encrypted with the second encryption key via the second Internet Protocol Security traffic flow.

11. The apparatus of claim 10, wherein the one or more processors are further configured to:
provide to the second device a request to rekey the second Internet Protocol Security traffic flow, and
obtain the second encryption key from the key value store by obtaining the second encryption key provided to the key value store in response to the request to rekey the second Internet Protocol Security traffic flow.

12. The apparatus of claim 8, wherein the Internet Key Exchange control node comprises a first of a plurality of Internet Key Exchange control nodes, wherein each of the plurality of Internet Key Exchange control nodes is configured to populate the key value store.

13. The apparatus of claim 12, wherein the key value store maintains encryption keys for a plurality of Internet Protocol Security traffic flows, and wherein the key value store may be accessed by each of the plurality of Internet Key Exchange control nodes.

14. The apparatus of claim 8, wherein the apparatus is arranged within a first compute cluster, and wherein the one or more processors are further configured to:
obtain, via the network interface, a second Internet Key Exchange protocol message associated with a second Internet Protocol Security traffic flow;
forward, via the network interface, the Internet Key Exchange protocol message to the second device;
obtain, via the network interface from a second key value store, a second encryption key used to transmit traffic via the second Internet Protocol Security traffic flow, wherein the second key value store was previously populated via a device associated with a second compute cluster;
obtain, via the network interface, a second data packet to be transmitted via the second Internet Protocol Security traffic flow; and
provide, via the network interface, the second data packet associated with the second Internet Protocol Security traffic flow encrypted with the second encryption key used to transmit traffic via the second Internet Protocol Security traffic flow.

15. One or more tangible, non-transitory computer readable media encoded with instructions, wherein the instructions, when executed by one or more processors, are operable to:
obtain, at a first device comprising an Encapsulating Security Payload protocol data node, an Internet Key Exchange protocol message indicating a first Internet Protocol Security traffic flow is to be established via the first device;
forward, from the first device, the Internet Key Exchange protocol message to a second device comprising an Internet Key Exchange control node;
obtain, at the first device from a key value store executing at a third device, an encryption key used to transmit traffic via the first Internet Protocol Security Traffic flow, wherein the key value store is populated with the encryption key in response to the second device obtaining the Internet Key Exchange protocol message via a message exchange between the second device and the third device;

obtain, at the first device, a first data packet to be transmitted via the first Internet Protocol Security traffic flow; and provide, from the first device, the first data packet encrypted with the encryption key of the first Internet Protocol Security traffic flow.

16. The one or more tangible, non-transitory computer readable media of claim 15, wherein the Encapsulating Security Payload protocol data node comprises a first of a plurality of Encapsulating Security Payload protocol data nodes, and wherein the instructions operable to obtain, at the first device, the first data packet are further operable to obtain the first data packet via Equal Cost Multipath routing.

17. The one or more tangible, non-transitory computer readable media of claim 16, wherein the instructions are further operable to:

obtain, at the first device, a second data packet of a second Internet Protocol Security traffic flow, wherein the key value store was previously populated with a second encryption key for the second Internet Protocol Security traffic flow via a second Encapsulating Security Payload protocol data node of the plurality of Encapsulating Security Payload protocol data nodes;

obtain, at the first device from the key value store, the second encryption key; and provide, from the first device, the second data packet encrypted with the second encryption key via the second Internet Protocol Security traffic flow.

18. The one or more tangible, non-transitory computer readable media of claim 17, wherein the instructions are further operable to:

provide to the second device a request to rekey the second Internet Protocol Security traffic flow; and obtain the second encryption key from the key value store by obtaining the second encryption key provided to the key value store in response to the request to rekey the second Internet Protocol Security traffic flow.

19. The one or more tangible, non-transitory computer readable media of claim 15, wherein the Internet Key Exchange control node comprises a first of a plurality of Internet Key Exchange control nodes, wherein each of the plurality of Internet Key Exchange control nodes is configured to populate the key value store.

20. The one or more tangible, non-transitory computer readable media of claim 15, wherein the instructions are further operable to:

obtain, at the first device, a second Internet Key Exchange protocol message associated with a second Internet Protocol Security traffic flow;

forward, from the first device, the Internet Key Exchange protocol message to the second device;

obtain, at the first device from a second key value store, a second encryption key used to transmit traffic via the second Internet Protocol Security traffic flow, wherein the second key value store was previously populated via a device associated with a second compute cluster;

obtain, at the first device, a second data packet to be transmitted via the second Internet Protocol Security traffic flow; and provide, from the first device, the second data packet associated with the second Internet Protocol Security traffic flow encrypted with the second encryption key used to transmit traffic via the second Internet Protocol Security traffic flow.

* * * * *